United States Patent [19]

Wunsch

[11] 3,931,744

[45] Jan. 13, 1976

[54] HAMMER-DRILL

[75] Inventor: Steffen Wünsch, Dettenhausen, Germany

[73] Assignee: Robert Bosch G.m.b.H., Stuttgart, Germany

[22] Filed: June 3, 1974

[21] Appl. No.: 476,139

[30] Foreign Application Priority Data

June 5, 1973 Germany ........................... 2328462

[52] U.S. Cl. ........................ 74/22; 74/56; 173/123

[51] Int. Cl.² ........................................ F16H 21/00

[58] Field of Search .......... 74/22, 56; 173/115, 119, 173/123, 13, 29, 48

[56] References Cited

UNITED STATES PATENTS

| | | | |
|---|---|---|---|
| 2,749,548 | 6/1956 | Turner | 74/22 |
| 2,814,277 | 11/1957 | Jimerson | 173/123 |
| 3,171,286 | 3/1965 | Stewart | 74/22 |
| 3,695,365 | 10/1972 | Schadlich | 74/22 |
| 3,803,952 | 4/1974 | Whale, Jr. | 173/123 |

FOREIGN PATENTS OR APPLICATIONS

| | | | |
|---|---|---|---|
| 860,713 | 2/1961 | United Kingdom | 74/56 |
| 95,234 | 3/1897 | Germany | 74/56 |

*Primary Examiner*—Samuel Scott
*Assistant Examiner*—Wesley S. Ratliff, Jr.
*Attorney, Agent, or Firm*—Michael J. Striker

[57] ABSTRACT

An axially reciprocable rotary spindle is mounted in the housing, and a first biasing arrangement urges the spindle in one axial direction outwardly of the housing. An impact member is mounted on this spindle for rotation with but limited axial displacement relative to the same and has an outer circumferential surface provided with cams inclined axially and circumferentially of the spindle and formed with one interruption per cam. A second biasing arrangement urges the impact member also in the aforementioned axial direction, and a fixedly mounted guide ring surrounds the impact member and forms a race for roller bodies corresponding in number to the interruptions and which roll in contact with the circumferential surface and the cam.

12 Claims, 4 Drawing Figures

HAMMER-DRILL

BACKGROUND OF THE INVENTION

The present invention relates generally to a drill, and in particular to a hammer drill.

Hammer drills are already known in the art. The are power-operated tools in which the drill bit can either be only rotated, or in which it can have axially acting blows superimposed upon its rotational movement. In some instances, these tools can also be switched so that only blows can be transmitted to the drill bit, that is the rotary motion can be switched off. In order to obtain the hammering action in these tools, it is known to mount the drive shaft which transmits motion to the drill bit for axial reciprocation, and to surround it with an impact member that is fixedly connected with the drive shaft and formed at one axial end with a plurality of circumferentially spaced projections. Adjacent this axial end is a stationary member which is fixedly mounted in the housing and which is formed with a further plurality of projections extending towards the impact member. The latter is urged by biasing means against the stationary component so that its projections will alternatively snap between those of the stationary component and be urged out from between them by the torque that is transmitted to the impact member. This transmits blows to the drive shaft which in turn transmits them to the drill bit.

It is evident that the projections of the stationary component and of the impact member will slide upon one another as they move into and out of interengagement. This sliding, in turn, causes friction which disadvantageously influences the effectiveness of these devices, aside from the undesired development of heat resulting from this friction. Added to these disadvantages of the prior-art constructions is a further one, namely the fact that relatively complicated mechanisms are necessary for moving their components to and from the hammer-drilling position.

SUMMARY OF THE INVENTION

Accordingly, it is a general object of the invention to provide an improved hammer drill of the type outlined earlier, which is simpler in its construction than the prior-art machines.

An additional object of the invention is to provide such an improved hammer drill which has an improved degree of efficiency in operation.

A further object of the invention is to provide such an improved hammer drill which is less expensive to construct than the prior-art machines.

Still a further object of the invention is to provide such a hammer drill in which vibrations caused by the operation of the impact member are not transmitted to the housing and therefore are not felt objectionably by a user.

In keeping with the above objects, and with others which will become apparent hereafter, one feature of the invention resides in a hammer drill which, briefly stated, comprises a housing, an axially reciprocable rotary spindle mounted in the housing, and first biasing means urging the spindle in one axial direction outwardly of the housing. An impact member is mounted on the spindle for rotation with but limited axial displacement relative to the same; the impact member has an outer circumferential surface provided with cam means which is inclined axially and circumferentially of the spindle and formed with one interruption per cam of the cam means. Second biasing means urges the impact member also in the aforementioned one axial direction, and a fixedly mounted guide ring surrounds the impact member and forms a race for roller bodies which correspond in number to the number of interruptions and which roll in contact with the circumferential surface and with the cam means.

This construction thus replaces the sliding friction between the projections of the prior-art devices with a rolling contact between the flanks of the screw flight means and the rolling bodies, which substantially reduces the losses due to friction and thus increases the mechanical efficiency of the device, in addition to which the development of friction-generated heat is significantly reduced.

The cam means may be provided with one or more cams, and it may be of the left-hand or the right-hand type. It may project from the surface of the impact member, or it may be recessed into the circumferential surface thereof. While the rolling bodies are advantageously spherical members, they could also be constructed as cylindrical rollers or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
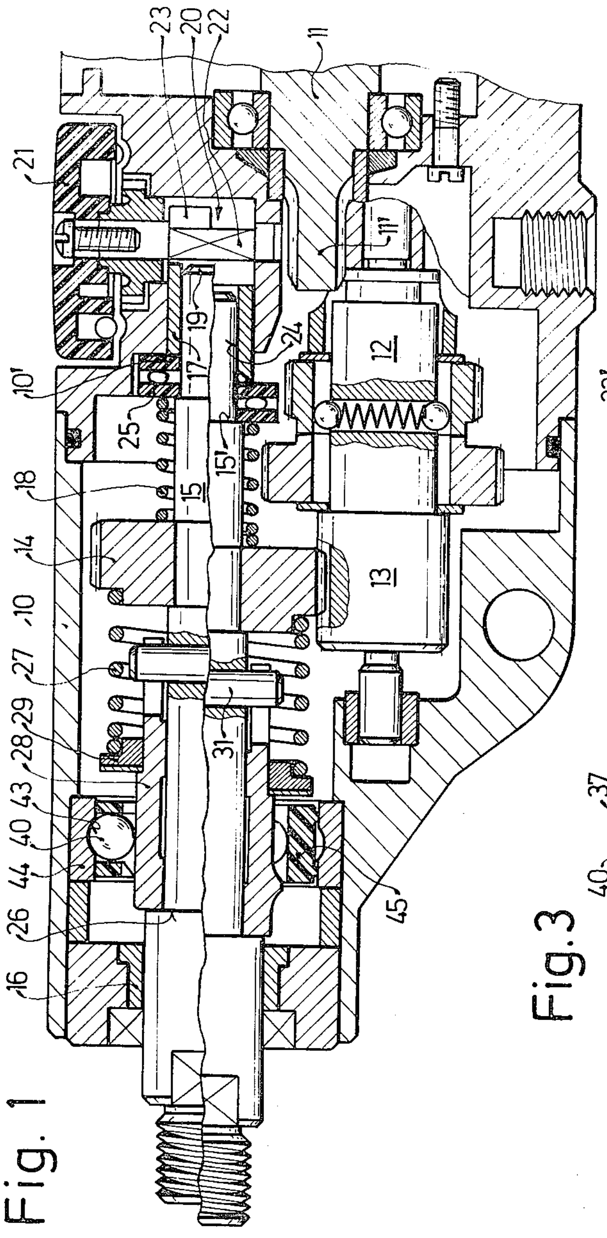
FIG. 1 is a fragmentary longitudinal section through a hammer drill embodying the invention.
Figure 2:
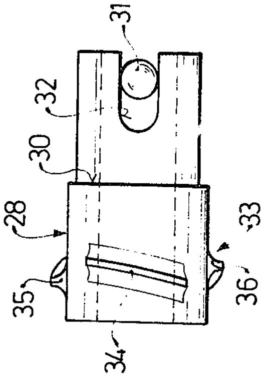
FIG. 2 is a side view illustrating the impact member of the embodiment in FIG. 1.
Figure 3:
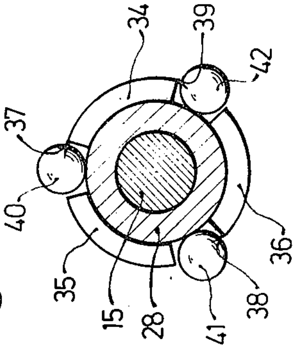
FIG. 3 is a partly sectioned end view of the impact member shown in FIG. 2.

Referring firstly to the embodiment shown in FIGS. 1–3, it will be seen that here the tool is provided with a housing 10 which is assembled of a plurality of elements and in which it should be understood that there is provided an electromotor (not shown). The housing will ordinarily also be provided with a handle portion which, however, is not illustrated because it is conventional. A jack shaft 11 is mounted in the housing and is to be driven by the motor; the shaft 11 in turn drives a shaft 12 via a pinion 11'. The end portion of the shaft 12 which faces towards the chuck of the tool, is formed with an annulus of teeth 13 which is engaged by the teeth of a gear 14 that is mounted fixedly on a spindle 15. The length of the teeth 13 is approximately twice as great as the length of the teeth on the gear 14.

The housing is provided with two slide bearings 16 and 17 in which the spindle 15 is journalled for rotation; a biasing spring 18 permanently tends to shift the spindle 15 towards the left in FIG. 1. A bolt 20 is provided by means of which the bearing 17 can be displaced; the bolt 20 is non-rotatably connected with a knob 21 and is of eccentric construction. In other words: the bolt has an approximately centrally located portion 22 of quadratic configuration and an eccentrically projecting cam portion 23. When the knob 21 is turned, and thereby the bolt 20 is similarly turned, the spindle 15 can be axially displaced between its two positions corresponding to pure drilling and to hammer drilling; for this purpose, the bearing 17 is displaced in a bore 24 of the housing 10 wherein it is slidably received. The end portion 19 of the spindle 15 is located slightly ahead of the end of the bearing 17 and is therefore displaced by the bearing and a radial bearing 25 which in turn contacts the bearing 17 on the one hand and a shoulder 15' of the spindle 15 on the other hand. The spring 18 bears upon the radial bearing 25. In the region of the end facing the chuck the spindle 15 is provided with a shoulder 26 which, however, is still located within the confines of the housing 10. An impact member 28 is urged into engagement with the shoulder 26 by a spring 27 which bears at one end on a spring disc 29 which in turn contacts a shoulder 30 of the impact member 28, and which bears with its other end upon the gear 14. As the drawing clearly shows, the impact member 28 cannot rotate with reference to the spindle 15, but it can become axially displaced relative thereto, for which purpose a pin 31 is provided which is mounted in the spindle 15 and extends into two longitudinal slots 32 which are formed at the right-hand end portion of the impact member 28 and into which the opposite outer axial ends of the pin 31 extend.

In accordance with the invention the outer circumferential surface of the impact member 28 is provided near its end portion facing the chuck with cam means 33 which is of the left-hand type in the illustrated embodiment and which has three cams 34–36. Each of these extends over a portion of arc that is smaller than 120°, and between circumferentially adjacent ones of the cams 34–36 there are forced openings or cutouts 37, 38 and 39, respectively. The width of the cutouts and their depth is such that a roller body 40, 41 or 42 can readily pass through the respective cutout. In the illustrated embodiment the roller bodies 40–42 are spherical members which are in part received in an annular groove 43 of a ring 44 that is fixedly mounted in the housing 10 and forms a race for them, and which in part are in rolling engagement with the outer circumferential surface of the impact member 28.

It will be appreciated that the ring 44 prevents displacement of the roller bodies 40–42 in axial direction, so that they can perform only a circumferential movement. The inner diameter of the cutouts 37–39 equals the inner diameter of the cam means 33; in other words, it is equal to the outer diameter of the impact member 28 beyond which the cams 34–36 extend outwardly. The width of the cutouts 37–39 in circumferential direction depends not only upon the diameter of the roller bodies 40–42, but also upon other considerations, such as the number of rotations of the screw spindle per unit of time, and the force of the spring 27. Whether the cam means is of the left-hand type or of the right-hand type depends upon the direction in which the spindle 15 must reciprocate to impart blows to the tool. These features can be readily determined without undue experimentation by those having ordinary skill in the art.

The bodies 40–42 are spaced at uniform circumferential distances, and are maintained at this spacing by a guide ring 45 which is located between the ring 44 and the impact member 28. In other words, there is a 120° spacing between circumferentially adjacent ones of the bodies 40–42. The ring 45 resembles a cage such as is used for the balls of a ball bearing, and it is thus entirely conventional. That flank of each of the cams 34–36 which faces towards the drive motor, that is towards the right in FIG. 1, is contoured to the form of the roller bodies 40–42, that is in this case it is part-spherical as evident from FIG. 2. The ring 44 itself may be the conventional outer race of a ball bearing.

If the machine of FIGS. 1–3 is to be used for drilling only, the knob 21 is so turned that the cam 23 shifts the bearing 17 and the bearing 25, and thereby the spindle 15, in left-hand direction in FIG. 1, as evidenced by the lower half of this spindle which is shown displaced towards the left with respect to the upper half. When this is done, the spindle is supported via the shoulder 15', the bearing 25 and the bearing 17 against the cam 23. Since the gear 14 is fixedly mounted on the spindle 15, the impact member 28 is also displaced towards the left by the spring 27 and is in contact with the shoulder 26 of the spindle 15. In this position, the roller bodies 40–42 contact the impact member 28 in the region facing towards the shoulder 30 and therefore do not engage the cams 34–36 so that the screw spindle 15 can now rotate without transmitting any axial impacts to its chuck.

If the machine is to be used for hammer drilling, that is if the chuck and the tool are to be both rotated and have axial impacts imparted to them, then the knob 21 is so turned that the cam 23 faces towards the motor (i.e., towards the right in FIG. 2). However, the spindle 15 continues to be urged to its left end position by the spring 18, so that the spindle 15 will still turn when energized, but will not have any impact transmitted to it. The spindle is supported on a shoulder 10' of the housing via its shoulder 15' at the radial bearing 25, at the roller body 40–42 assume the same position relative to the impact member 28 as in the pure drilling position, that is they do not contact the cams 34–36.

Impacts will be transmitted to the spindle 15 only when the tool engaged in the chuck is displaced towards the right, thereby causing a similar displacement of the spindle 15. This occurs when the housing is pushed towards the left in FIG. 1, in order to press the tool in the chuck against the workpiece (the tool and the chuck have been omitted as not essential for an understanding of the invention). When this is done, and the spindle 15 moves towards the right against the force of the spring 18, the roller bodies 40–42 now can travel through the cutouts 37–39 into the part of the impact member 28 which is formed with the cams. Since the ring 44 with the cage ring 45 and the roller bodies 40–42 cannot be axially displaced, the pressure of the spring 27 causes a frictional contact between the roller bodies 40–42, the ring 44 and those flanks of the cams 34–36 which face towards the right in FIG. 1, so that, since the impact member 28 is connected with the screw spindle 15 against rotation relative to the same but with freedom of axial displacement relative to it, the impact member 28 is axially displaced towards the right against the force of the spring 27 (which thereby becomes further tensioned) by the extent to which the cams are actually inclined relative to the impact member 28. During the continual rotation of the spindle 15 the roller bodies come opposite the respective cutouts 37–39, thus suddenly freeing the impact member 28 for axial displacement, with the result that the impact member is instantaneously displaced towards the left by the force of the spring 27, into engagement with the shoulder 26 of the spindle 15, whereby it transmits to the spindle 15 an axial blow in direction towards the chuck. This blow is not transmitted to the housing, so that the latter operates without the unpleasant transmission of vibrations or shock to a person holding the housing.

As the spindle 15 continues to rotate, the roller bodies 40–42 again come in contact with the axially right-hand flanks of the cams 34–36, and the previously described sequence of events is repeated. This continues until the urging of the machine towards the left in FIG. 1 (i.e., towards the workpiece) is terminated, thus permitting the spring 18 to shift the spindle 15 towards the left again and causing disengagement of the roller bodies from the flanks of the cams, so that the spindle now merely rotates but receives no further axial blows.

Figure 4:
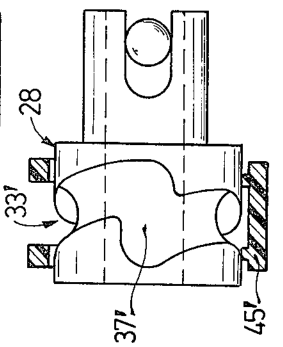
FIG. 4 is a view analogous to FIG. 1, but showing a different embodiment.

The embodiment in FIG. 4 is analogous to that of FIGS. 1–3 and like reference numerals identify like components. FIG. 4 shows that the cam means can have only a single cam, just as it can have more than the three which are shown in FIGS. 1–3. However, if the cam means has a single cam, then it will also have a single cutout. Correspondingly, it will have a single roller body associated with it, it being understood that the number of roller bodies always corresponds to the number of cutouts, and that the latter number corresponds to the number of cams. The cam means is here identified with reference numeral 33' and it is additionally shown that, unlike FIGS. 1–3, the cam means does not project beyond the outer circumferential surface of the impact member 28, but instead is recessed into it. The cutouts in this case are longitudinal grooves 37' (only one visible) which are also formed in the outer circumferential surface of the impact member 28 and which extend axially of the same. The bottom wall of each of these grooves 37' then corresponds to the smallest diameter of the cam means 33', and the cage 45' is radially supported on the circumferential surface of the impact member. As in the preceding embodiment, the number of cams, the pitch thereof and whether or not the cams are of the right-hand or left-hand type, is determined in dependence upon the same considerations as outlined earlier.

It will be understood that each of the elements described above, or two or more together, may also find a useful application in other types of constructions differing from the types described above.

While the invention has been illustrated and described as embodied in a hammer drill, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A hammer drill, comprising a housing; a spindle mounted in said housing for rotation and axial reciprocation with respect thereto; first biasing means urging said spindle in one axial direction outwardly of said housing; an impact member mounted on said spindle for rotation with and limited axial displacement relative to the same and having an outer circumferential surface coaxial with said spindle; second biasing means urging said impact member also in said one axial direction; cam means connected to said impact member and projecting outwardly from said circumferential surface thereof, and including a plurality of cams which are inclined axially and circumferentially of said impact member and separated from one another in the circumferential direction by interruptions extending all the way to said circumferential surface of said impact member; a fixedly mounted guide ring surrounding said impact member and having a race; a number of roller bodies which corresponds to the number of said cams and each in rolling contact with said race, said circumferential surface and a respective of said cams; and a cage for maintaining said roller bodies at equi-angular distances about said circumferential surface.

2. A hammer-drill as defined in claim 1, wherein said cam means comprises three cams each of which surrounds said circumferential surface over a portion of arc that is smaller than 120° by the circumferential width of its associated interruption.

3. A hammer-drill as defined in claim 1, wherein said roller bodies are spherical.

4. A hammer-drill as defined in claim 1, wherein said guide ring has an inner side facing said impact member and provided with a circumferential groove which constitutes said race.

5. A hammer-drill as defined in claim 1, said impact member having a shoulder; further comprising a gear mounted on said spindle and spaced from said shoulder in the direction opposite said one direction; and wherein said second biasing means comprises a biasing spring which bears upon said gear and said shoulder, respectively.

6. A hammer-drill as defined in claim 1, wherein said impact member is provided with a pair of diametrally opposite axial slots; and further comprising a pin extending transversely through said spindle and having respective end portions each of which is received with clearance in one of said slots.

7. A hammer drill comprising a housing; a spindle mounted in said housing for reciprocation and for rotation at an angular speed with respect to said housing and having an abutment; an impact member mounted on said spindle for rotation therewith at said angular speed and for limited axial displacement relative to the same and having an outer circumferential surface coaxial with said spindle; biasing means urging said impact member into contact with said abutment of said spindle; cam means on said impact member at said circumferential surface and having a plurality of cam surfaces which are inclined axially and circumferentially of said impact member and have end portions that are offset from one another in the axial direction of said impact member; a guide ring stationarily mounted in said housing and having an annular race coaxially surrounding said impact member; and a number of roller bodies which corresponds to the number of said cam surfaces and each in rolling contact with said race and a respective of said cam surfaces so that said impact member is displaced against the action of said biasing means away from said abutment during the rotation of said spindle and is suddenly displaced by said biasing means into contact with said abutment when the respective roller bodies reach said axially offset end portions of the respective cam surfaces.

8. A hammer-drill as defined in claim 7, wherein said cam means projects outwardly from said circumferential surface.

9. A hammer-drill as defined in claim 7, wherein said race is provided with a cage maintaining a corresponding plurality of said roller bodies spaced at equi-angular distances about said circumferential surface.

10. A hammer-drill as defined in claim 7, wherein said cam means is recessed in said circumferential surface; and comprising axial grooves formed in said circumferential surface to a depth which at least equals the recessing of said cams.

11. A hammer-drill as defined in claim 7, and further comprising a cage for said rolling bodies, accommodated within and radially supported by said guide ring.

12. A hammer-drill as defined in claim 7, and further comprising a cage for said rolling bodies, accommodated within said guide ring and radially supported by said circumferential surface of said impact member.

* * * * *